J. Ericsson Sheet 1, 2 Sheets.
Screw Propeller.
No. Reissue 129 Reissued March 10, 1849
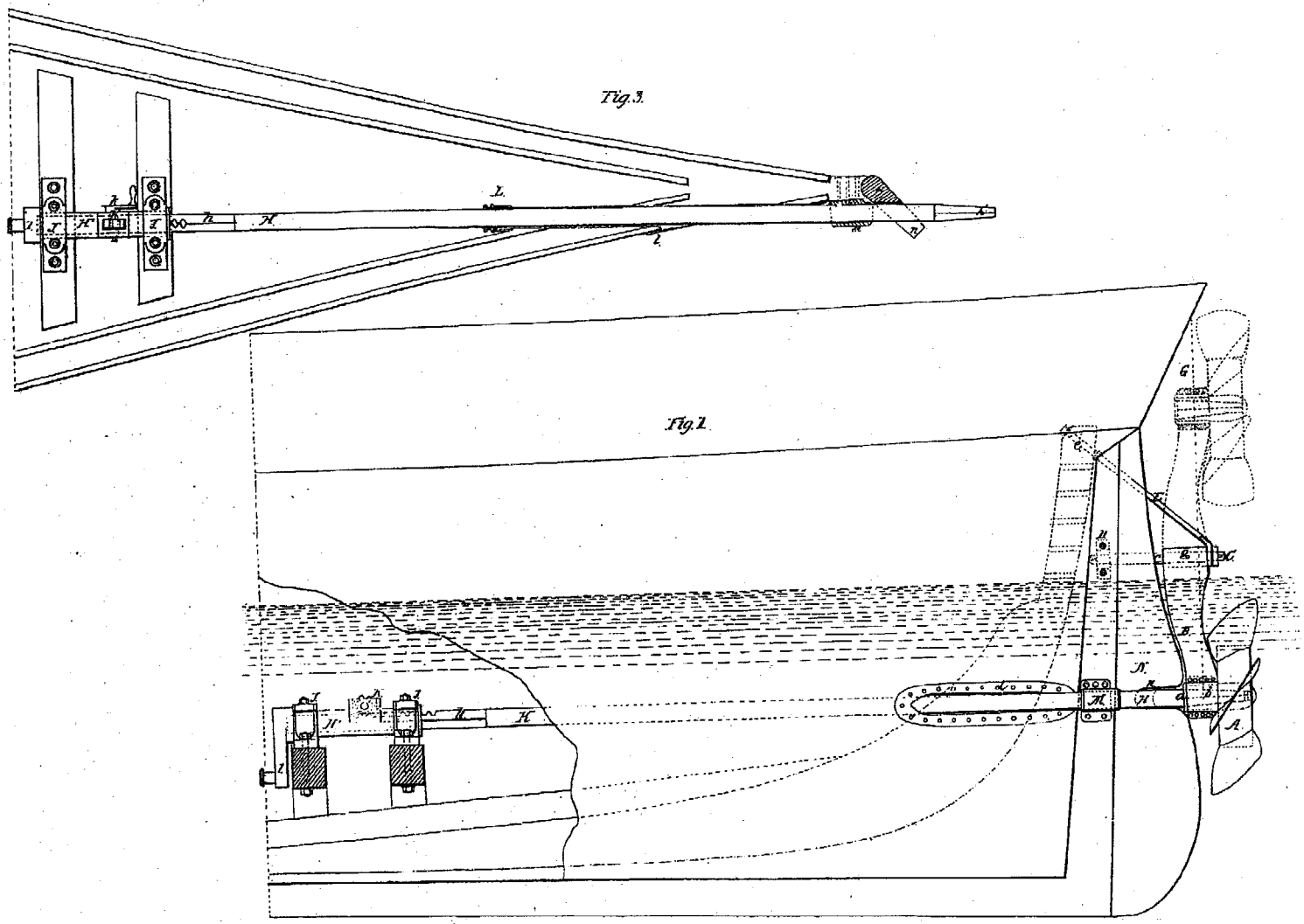
N. PETERS, PHOTO-LITHOGRAPHER, WASHINGTON, D. C.

J. Ericsson. Sheet 2, 2 Sheets
Screw Propeller
No. Reissue 129 Reissued March 19, 1849
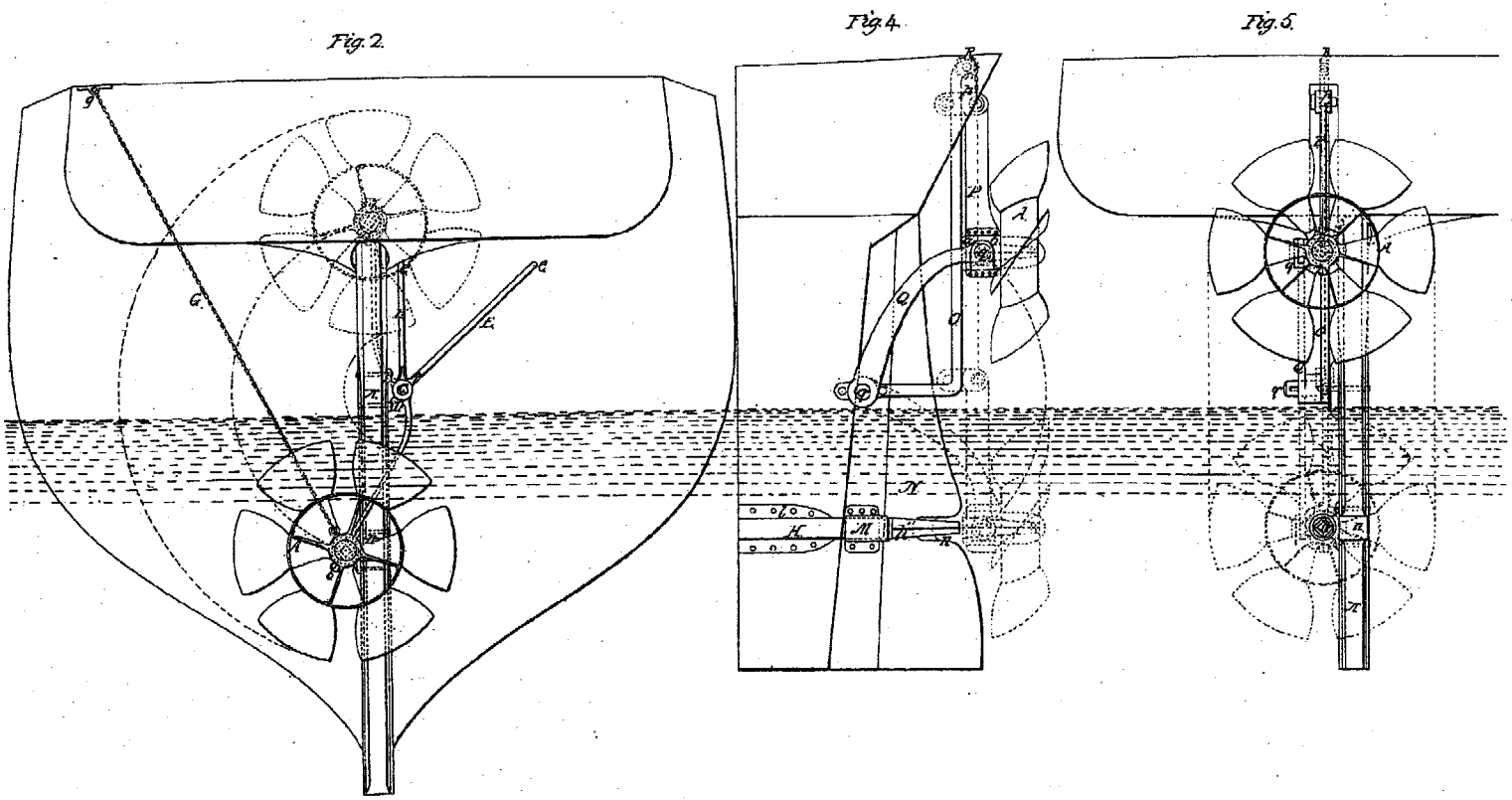
R. PETERS, PHOTO-LITHOGRAPHER, WASHINGTON, D. C.

UNITED STATES PATENT OFFICE.

JOHN ERICSSON, OF NEW YORK, N. Y.

IMPROVEMENT IN PROPELLING SHIPS.

Specification forming part of Letters Patent No. 3,869, dated December 31, 1844; Reissue No. 129, dated March 10, 1849.

*To all whom it may concern:*

Be it known that I, JOHN ERICSSON, of the city, county, and State of New York, have invented new and useful Improvements in Propelling Ships; and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a side elevation of the stern of a ship with part of the planking and timbers removed to show the inner portion of the propeller-shaft; Fig. 2, a stern view of the ship; Fig. 3, a sectional plan of the stern through the center of the propeller-shaft.

The other sections will be explained hereinafter.

The same letters indicates the parts in all the figures.

Prior to my invention the leading objections to the use of a propeller at the stern of a ship was the weakening of the ship by cutting the stern to form a recess for the propeller forward of the rudder, and thus carrying the stern-post, or the part with which the rudder is connected, so far back as greatly to reduce the stability of the structure. To avoid this the use of two propellers, one on each side of the run of the ship, was essayed; but this is well known to be even more objectionable, as the shafts without care must pass out through the run of the ship so far from the stern-post and keelson to leave sufficient room between the axis of the propeller and the run of the ship for the semi-diameter of the propellers as greatly to strain the ship, and requiring, in addition to the complexity consequent on two propellers, outriggers at the sides for the support of the projecting part of the shafts, which for sea purposes is highly objectionable. Another serious objection was the difficulty of access to the propeller for the purpose of repairs, and the resistance presented by it when sailing alone.

To obviate these and other minor objections not necessary to enumerate was the object of my invention, the principle or character of which consists in passing the shaft of the propeller through the run of the ship and by the side of the stern-post, that one of the bearings may be attached thereto for strength and stability, the propeller being placed abaft the rudder; and as the location of the shaft would of necessity interfere with the play of the rudder, this part of my invention consists in combining the location of the shaft and propeller with the rudder made with a slot commencing at the outer edge, that it (the rudder) may have the requisite play; and my invention also consists in supporting the propeller abaft the vessel by a sliding or swinging frame having a box in which a journal of the hub turns, when this is combined with the shaft made in two parts, one sliding within the other, and so connected and provided with the necessary mechanical means that the sliding part of the shaft may be inserted and withdrawn from the hub of the propeller, to which it is properly adapted, to admit of removing and lifting the propeller out of the water.

The propeller, the hub of which is elongated and formed into a journal, is supported abaft the vessel by a frame of wrought-iron or composition metal, the lower end of which is provided with a bearing made to receive the said journal. The frame is made either to slide up and down on a suitable guide, the upper part of which guide is attached to the ship's counter and the lower part to the stern-post, or it is made to swing on an axis or spindle attached to the stern-post just above the water-line, and it is raised and lowered by a chain worked by a windlass. The propeller-shaft passes through the run by the side of the stern-post, a bearing being bolted to the stern-post to support the shaft. To prevent the shaft from interfering with the play of the rudder, a slot is cut in the latter for about half its width, beginning at its outer edge. This slot permits the rudder to turn as far as an angle of forty-five degrees with the center line of the vessel.

The propeller-shaft is composed of two parts, the one sliding within the other a distance equal to the length of the hub of the propeller, the outer part being the sliding one, and the motion requisite to withdraw it from the hub of the propeller being given to it by a rack and pinion. Both ends of this sliding part of the shaft are made either square or six-sided or round and feathered, the outer end being made taper, corresponding to a taper hole in the hub of the propeller, and the inner end being parallel and corresponding to a parallel hole in the other part of the shaft. The water is prevented from entering around the shaft where it goes through the run by a stuffing-box. The position of the propeller when attached to the shaft is close abaft the rudder, as its center line is ordinarily about one foot on the starboard or larboard side of the ship's middle line.

A description of drawings hereto annexed, illustrating my invention, is given above.

A is the propeller.

*a* is the hub, elongated and formed into a journal.

B is a frame, of wrought-iron or composition metal, supporting the propeller by a bearing, *b*, formed at the narrow end of the frame, which embraces the journal upon the hub.

C C represent the axis or spindle, of wrought-iron, the inner end of which is carried by a bearing, D, bolted to the side of the stern-post, and the outer end is supported by two braces, E E, secured to the transom of the ship at *e e*. This axis passes through the wide end of the frame B, which is firmly secured to it by the pulley *c*.

G is the chain, attached to the bearing *b*, for raising and lowering the propeller. It passes through an eye, *g*, attached to the upper part of the stern, and is connected to the capstan or a small windlass. This chain is provided with a stop so placed that when the propeller is full down the stop will bear against the side of the eye *g*.

H H′ represent the propeller-shaft, made in two parts, one sliding a short distance within the other. The inner end, *h*, of the sliding part H is formed into a parallel square corresponding to a hole in the other part, H′, of the shaft, which receives the square. The outer end, *h′*, of the sliding part is formed into a taper square corresponding to a taper hole in the hub of the propeller.

I is the crank, firmly keyed to the propeller-shaft, to communicate motion to it from a steam-engine.

J J are pillow-blocks supporting the propeller-shaft.

K is a pinion inserted in a box formed on the hollow part of the propeller-shaft, for moving back and forth the sliding part. One corner of the square *h*, at the inner end of the sliding part, is cut into a rack to suit the pinion.

*k* is the winch for turning the pinion.

L is the stuffing-box, secured to the planking of the ship at *l l*, to prevent the water from entering around the shaft.

M is the bearing, of composition metal, firmly bolted to the sides of the stern-post.

N is the rudder.

*n* is the slot cut into the rudder, to admit of a free motion being given to it.

Fig. 4 is a part of the side elevation of the stern of a ship, showing the mode of raising and lowering the propeller by means of a guide attached to the ship's counter; Fig. 5, part of a stern view of the same arrangement. All parts in these figures corresponding to those in Figs. 1, 2, and 3 are marked by the same letters of reference.

O is the guide-rod, made of wrought-iron, the upper end being secured to the ship's counter and the lower end bolted to the side of the stern-post.

P is a frame, of wrought-iron, provided at the lower end with a bearing, *b*, for receiving the journal upon the elongated part of the hub of the propeller, as before described. The upper end is provided with a jaw, *p*, corresponding to the guide-rod O.

Q is a radius-bar, attached to the frame P by a joint, *q*, and working on an axis, *q′*, secured to the side of the stern-post.

R is the pulley over which the chain G, before described, passes.

Having thus fully described the construction and application of my invention and illustrated it by drawings, I will proceed to describe its operation. Whenever it becomes necessary to unship the propeller, either to repair it or to prevent the obstruction it offers to the progress of the ship while she is using her sails only, the propeller-shaft is drawn in by turning the winch of the pinion on the hollow part of the shaft, and the frame which supports the propeller is drawn up by turning the windlass or capstan to which the chain for raising or lowering the frame is attached until the propeller is brought to the proper height above the surface of the water, (as indicated in red in Figs. 1 and 2 and in black in Figs. 4 and 5,) where it is lashed to the counter. In lowering the propeller to reattach it to the shaft, care must be taken to let it down to the full extent before the shaft is moved out.

I do not wish to confine myself to the precise structure and arrangement of parts herein specified, but to vary these as may be desired so long as the principle and character of my invention are retained.

It will be obvious from the foregoing that parts of my invention may be advantageously employed without others—as, for instance, the location of the shaft and propeller, in connection with the slotting of the rudder, may be employed to advantage without the use of the mode of disconnecting the propeller from the shaft and elevating it, and so this latter part of my invention may be employed without the former; but by union of the whole the best results will be attained.

What I claim as my invention, and desire to secure by Letters Patent, is—

1. The above-described location or arrangement of the propeller-shaft, in combination with the rudder, made with a slot or recess to admit of the play thereof, substantially in the manner and for the purpose specified.

2. Sustaining the propeller abaft the rudder by a swinging or sliding frame, substantially as described, in combination with the shaft, made in two parts, substantially in the manner and for the purpose specified.

3. In combination with the arrangement or location of the propeller-shaft and the hanging of the propeller in a sliding or moving frame, the making of the shaft in two parts, substantially in the manner and for the purpose specified.

J. ERICSSON.

Witnesses:
JOS. A. EMERSON,
JOHN O. STEVENS.